(12) United States Patent
Hsieh et al.

(10) Patent No.: US 12,020,873 B2
(45) Date of Patent: Jun. 25, 2024

(54) SENSING KEYBOARD AND SENSING KEYSWITCHES THEREOF

(71) Applicant: Darfon Electronics Corp., Taoyuan (TW)

(72) Inventors: Yu Chun Hsieh, Taoyuan (TW); Chen Yang, Taoyuan (TW); Chia Hung Liu, Taoyuan (TW); Shao Lun Hsiao, Taoyuan (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 17/894,254

(22) Filed: Aug. 24, 2022

(65) Prior Publication Data

US 2023/0129863 A1    Apr. 27, 2023

Related U.S. Application Data

(60) Provisional application No. 63/272,196, filed on Oct. 27, 2021.

(51) Int. Cl.
H01H 13/14 (2006.01)
G06F 1/3296 (2019.01)
(Continued)

(52) U.S. Cl.
CPC ........... H01H 13/14 (2013.01); G06F 1/3296 (2013.01); G06F 3/0202 (2013.01); H01H 13/70 (2013.01)

(58) Field of Classification Search
CPC ...... H01H 13/14; H01H 13/70; H01H 13/803; H01H 2225/008; H01H 3/12;
(Continued)

(56) References Cited

U.S. PATENT DOCUMENTS 5,283,906 A    2/1994   Chen
5,461,266 A   10/1995   Koreeda et al.
(Continued)

FOREIGN PATENT DOCUMENTS

CN    203102166 U    7/2013
CN    104919400 A    9/2015
(Continued)

OTHER PUBLICATIONS

Office action of counterpart application by Taiwan IP Office dated Jan. 16, 2023.

*Primary Examiner* — Lheiren Mae A Caroc (57) ABSTRACT

A sensing keyswitch including a key body, a key-sensing switch and an enabling switch is provided. The key body includes a key top, and a key driver and an enabler which can move with the key top in the same keystroke cycle. The key-sensing switch electrically connected to a key circuit is in a disabled mode to save power and cannot sense the change of the sensing intensity caused by the movement of the driver. The enabling switch is electrically connected to an enabling circuit, wherein when the enabling switch is triggered by the enabler, the enabling switch outputs an enabling signal through the enabling circuit for enabling the key-sensing switch to enter an enabled mode, so that the key-sensing switch can sense the change of the sensing intensity caused by the movement of the key driver to trigger a key signal.

20 Claims, 8 Drawing Sheets (51) Int. Cl.
*G06F 3/02* (2006.01)
*H01H 13/70* (2006.01)

(58) Field of Classification Search
CPC ... H01H 13/705; G06F 1/3296; G06F 3/0202; G06F 3/023; G06F 1/3271; G06F 3/02; Y02D 10/00
See application file for complete search history.

(56) References Cited

U.S. PATENT DOCUMENTS

| | | | |
|---|---|---|---|
| 5,539,400 | A | 7/1996 | Mears |
| 5,767,594 | A | 6/1998 | Cheng |
| 5,943,233 | A | 8/1999 | Ebina et al. |
| 6,137,071 | A | 10/2000 | Yeh et al. |
| 6,246,019 | B1 | 6/2001 | Nakamura et al. |
| 6,303,887 | B1 | 10/2001 | Ando |
| 6,590,565 | B2 | 7/2003 | Hosoya |
| 6,694,442 | B2 | 2/2004 | Yeh |
| 7,166,813 | B2 | 1/2007 | Soma et al. |
| 7,217,893 | B1 | 5/2007 | Huang et al. |
| 7,541,554 | B2 | 6/2009 | Hou |
| 7,572,996 | B2 | 8/2009 | Chi |
| 8,759,702 | B2 | 6/2014 | Huang et al. |
| 9,012,795 | B2 | 4/2015 | Niu |
| 9,952,682 | B2 | 4/2018 | Zhang et al. |
| 10,061,411 | B2 | 8/2018 | Peretz et al. |
| 11,735,379 | B2* | 8/2023 | Chang ............... H03K 17/97 200/345 |
| 11,770,123 | B2* | 9/2023 | Yang ............... H01H 13/705 250/224 |
| 2001/0027914 | A1 | 10/2001 | Hsu |
| 2004/0021632 | A1 | 2/2004 | Lou |
| 2018/0083619 | A1* | 3/2018 | Hou ............... H03K 17/969 |

FOREIGN PATENT DOCUMENTS

| | | |
|---|---|---|
| CN | 109672437 A | 4/2019 |
| CN | 110187757 B | 8/2019 |
| CN | 210005959 U | 1/2020 |
| EP | 0114197 A2 | 8/1984 |
| EP | 0269320 A1 | 6/1988 |
| EP | 3264602 A1 | 3/2018 |
| TW | M254717 U | 1/2005 |
| TW | 201128485 A | 2/2010 |
| TW | 201435660 A | 9/2014 |
| TW | 201809971 A | 7/2016 |
| TW | I602085 B | 10/2017 |
| TW | I678716 B | 12/2019 |
| WO | 81/00763 A1 | 3/1981 |
| WO | 00/62148 A1 | 10/2000 |

* cited by examiner

SENSING KEYBOARD AND SENSING KEYSWITCHES THEREOF

This application claims the benefit of U.S. provisional application Ser. No. 63/272,196, filed Oct. 27, 2021, the disclosure of which is incorporated by reference herein in its entirety.

TECHNICAL FIELD

The disclosure relates in general to a key, and more particularly to a sensing keyboard and sensing keyswitches thereof.

BACKGROUND

Optical axis keyboard uses an optical switch to generate a key output signal. The optical switch is normally composed of a pair of an optical emitter and an optical receiver. To detect the change of the optical signal, the optical switch must continuously emit and receive the optical signal. That is, the optical switch is normally turned on and in a power consumptive state even it is not used over a long period of time, and extra power-consumption will occur.

SUMMARY

The disclosure is directed to a sensing keyboard and sensing keyswitches thereof. When the sensing keyswitches are in a disabled mode, one or more than one sensing keyswitch on the sensing keyboard, when being pressed, can individually generate an enabling signal to enable one or more than one sensing keyswitch on the sensing keyboard once or enable one or more than one sensing keyswitch to maintain the enabled mode for at least one delay period. Since the sensing keyswitches can be enabled/disabled individually or by region, when the sensing keyboard is in a working mode, there are unpressed sensing keyswitches in a disabled mode to save power.

According to one aspect of the disclosure, a sensing keyswitch including a key body, a key-sensing switch and an enabling switch is provided. The key body includes a key top, and a key driver and an enabler which can move with the key top in the same keystroke cycle. The key-sensing switch electrically connected to a key circuit is in a disabled mode to save power and cannot sense the change of the sensing intensity caused by the movement of the driver. The enabling switch is electrically connected to an enabling circuit, wherein when the enabling switch is triggered by the enabler, the enabling switch outputs an enabling signal through the enabling circuit for enabling the key-sensing switch to enter an enabled mode, so that the key-sensing switch can sense the change of the sensing intensity caused by the movement of the key driver to trigger a key signal.

According to one embodiment, after the key signal is triggered, the key-sensing switch returns to the disabled mode to save power.

According to one embodiment, after the key signal is triggered, the key-sensing switch maintains at the enabled mode.

According to one embodiment, when the key-sensing switch maintains at the enabled mode, the enabling switch is in a disabled mode; when the key-sensing switch returns to the disabled mode, the enabling switch is in an enabled mode.

According to one embodiment, the enabler moves with the key top along an enabling path to trigger the enabling switch.

According to one embodiment, the key driver moves with the key top along a key driving path to trigger the key-sensing switch.

According to one embodiment, the key body includes a pair of brackets, a bottom plate and a restorator. The pair of brackets connect the key top and the bottom plate, the restorator is disposed between the key top and the bottom plate, and the key driver is located on the key top, the brackets or the restorator.

According to one embodiment, the key driver and the enabler are extended from the key top in one piece and synchronically move with the key top.

According to one embodiment, in the keystroke cycle, the enabling switch is triggered earlier than the key-sensing switch.

According to one aspect of the disclosure, a sensing keyboard including several sensing keyswitches is provided. After one of the sensing keyswitches is enabled by a corresponding enabler, only the corresponding key-sensing switch of the enabled sensing keyswitch can sense the change of the sensing intensity caused by the movement of the corresponding key driver to trigger a key signal, and the corresponding key-sensing switches of the remaining sensing keyswitches maintain at the disabled mode.

According to one aspect of the disclosure, a sensing keyboard including several sensing keyswitches is provided. Each of the sensing keyswitches has an exclusive enabler and an exclusive enabling switch. After one of the sensing keyswitches is enabled by the corresponding enabler, apart from the enabled sensing keyswitch, each or at least one of the remaining sensing keyswitches can sense the change of the sensing intensity caused by the movement of the corresponding key driver through the corresponding key-sensing switch to trigger a key signal.

According to one aspect of the disclosure, a sensing keyboard including at least one enabling switch, an enabler and several sensing keyswitches is provided. The at least one enabling switch is electrically connected to an enabling circuit. Each of the sensing keyswitches includes a key body and a key-sensing switch. The key body includes a key top and a key driver, wherein when the key top moves, the key driver is synchronically driven to move. The key-sensing switch electrically connected to a key circuit is in a disabled mode and cannot sense the change of the sensing intensity caused by the movement of the driver. When the key top of at least one of the sensing keyswitches moves and drives the enabler to move synchronically to trigger the enabling switch, the key-sensing switch enters an enabled mode, so that the key-sensing switch can sense a change of the sensing intensity caused by the movement of the driver to trigger a key signal.

According to one embodiment, after the enabling switch is triggered in the previous keystroke cycle, the key-sensing switch cannot be triggered until the next keystroke cycle.

According to one embodiment, after the key signal is triggered, the key-sensing switch returns to the disabled mode to save power.

According to one embodiment, after the key signal is triggered, the key-sensing switch maintains at the enabled mode.

According to one embodiment, when the key-sensing switch maintains at the enabled mode, at least one enabling switch is in a disabled mode; when the key-sensing switch returns to the disabled mode, at least one enabling switch is in an enabled mode.

According to one embodiment, the key driver moves with the key top along a key driving path to trigger the key-sensing switch, the enabler moves with the key top along an enabling path to trigger the enabling switch, and the enabling path is shorter than the key driving path.

According to one embodiment, the sensing keyboard has a working mode and a non-working mode; at least one sensing keyswitch in the working mode normally is in the disabled mode to save power.

According to one embodiment, after entering the enabled mode, the sensing keyswitch maintains the enabled state in a delay period; if the sensing keyswitch is not pressed for the second time in the delay period, the sensing keyswitch returns to disabled state.

According to one aspect of the disclosure, a sensing keyboard including at least one enabling switch and several sensing keyswitches is provided. The at least one enabling switch is electrically connected to an enabling circuit. Each of the sensing keyswitches includes: a key body including a key top, a key driver and a key-sensing switch. When the key top moves, the key driver is synchronically driven to move. The key-sensing switch electrically connected to a key circuit is in a disabled mode and cannot sense the change of the sensing intensity caused by the movement of the driver. In the first keystroke cycle, the key top of at least one of the sensing keyswitches is pressed for the first time and drives the key driver to move and trigger the enabling switch, so that the key-sensing switch enters an enabled mode. Within at least one second keystroke cycle after the first keystroke cycle, the key top of at least one of the sensing keyswitches is pressed and drives the key driver to move, so that the key-sensing switch can sense a change of the sensing intensity caused by the movement of the driver to trigger a key signal.

The above and other aspects of the disclosure will become better understood with regard to the following detailed description of the preferred but non-limiting embodiment(s). The following description is made with reference to the accompanying drawings.

DETAILED DESCRIPTION

Technical solutions for the embodiments of the present application are clearly and thoroughly disclosed with accompanying drawings. Obviously, the embodiments disclosed below are only some rather than all of the embodiments of the present application. All embodiments obtained by anyone ordinarily skilled in the technology field of the present application according to the disclosed embodiments of the present application are within the scope of protection of the present disclosure if the obtained embodiments lack innovative labor. Similar/identical designations are used to indicate similar/identical elements.

The sensing keyboard according to each embodiment of the present disclosure disclosed below comprises several sensing keyswitches. The sensing keyswitches can be enabled/disabled individually or by region. In general, the sensing keyboard has a working mode and a non-working mode. When all sensing keyswitches are in a disabled state or the system (any computer or host with computation ability) is in a sleep/standby/shutdown mode, the sensing keyboard is in a non-working mode. When one or more than one sensing keyswitch is in an enabled mode or the system is in a working mode, the sensing keyboard is in the working mode. When the sensing keyboard is in the non-working mode, all sensing keyswitches are in a disabled state and are able to save power. For the sensing keyboard to achieve a maximum power saving effect (for example, the sensing keyboard can save power even when in the working mode), when one or a part of the sensing keyswitches are in the enabled mode, some or all of the unpressed sensing keyswitches must be in the disabled mode. Thus, the sensing keyswitches of the sensing keyboard must be enabled/disabled individually or by region. When a sensing keyswitch is in the enabled state, this represents that the key-sensing switch of the sensing keyswitch is turned on and can be triggered, and the sensing keyboard can output a key signal generated when the key-sensing switch is triggered.

Figure 1A:
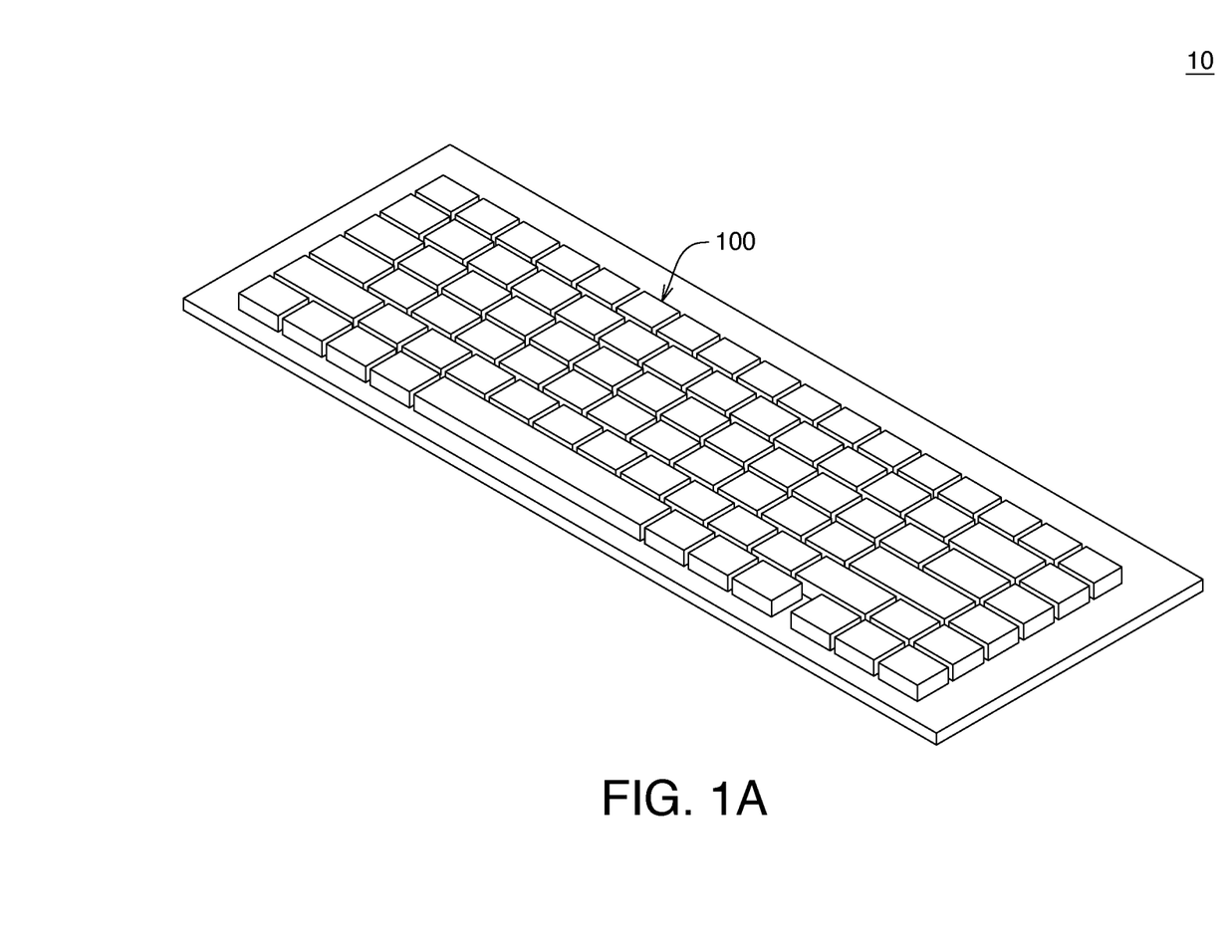
FIG. 1A is a schematic diagram of a sensing keyboard according to an embodiment of the present disclosure.
Figure 1B:
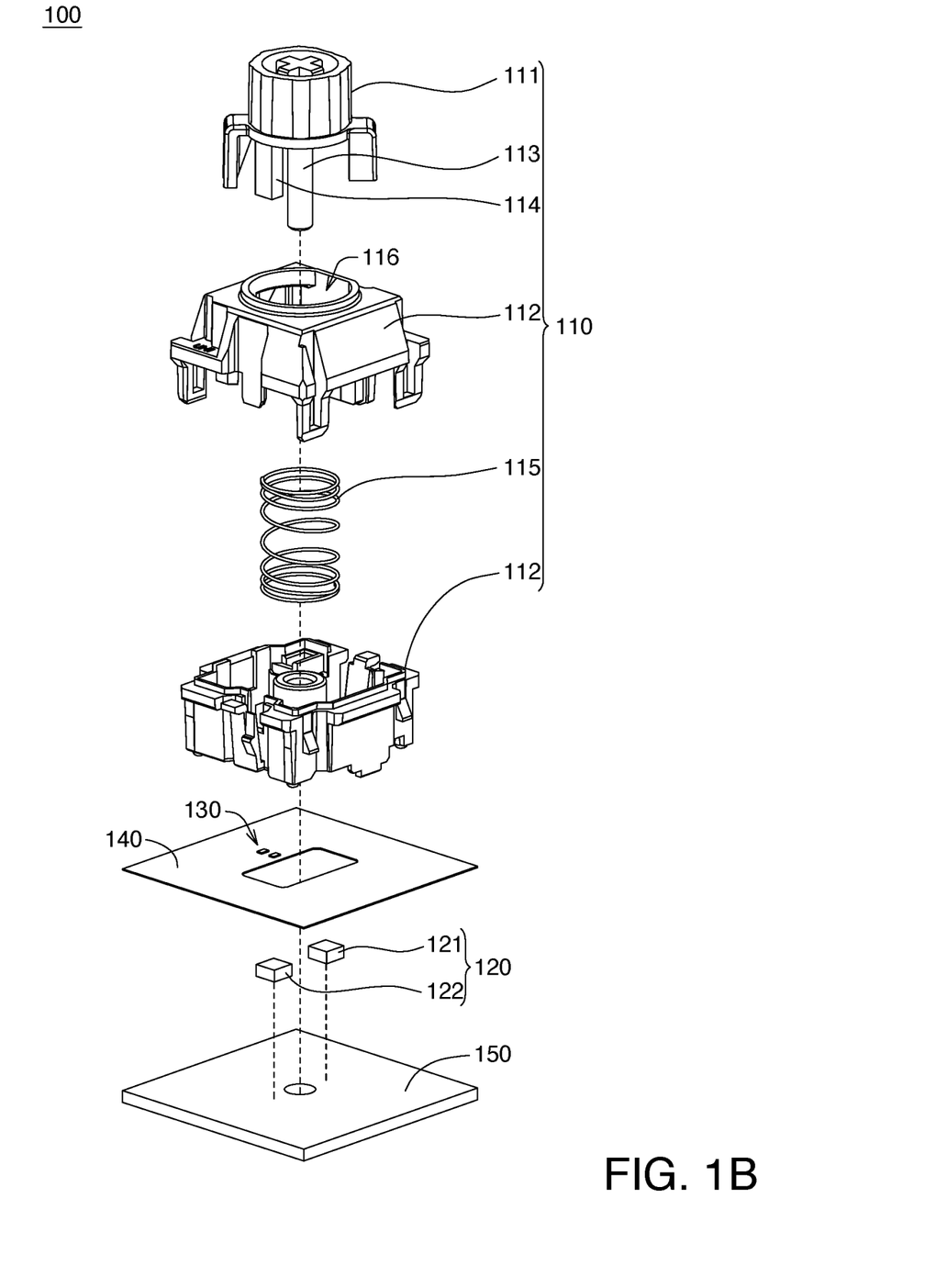
FIG. 1B is an explosion diagram of a sensing keyswitch according to an embodiment of the present disclosure.
Figure 1C:
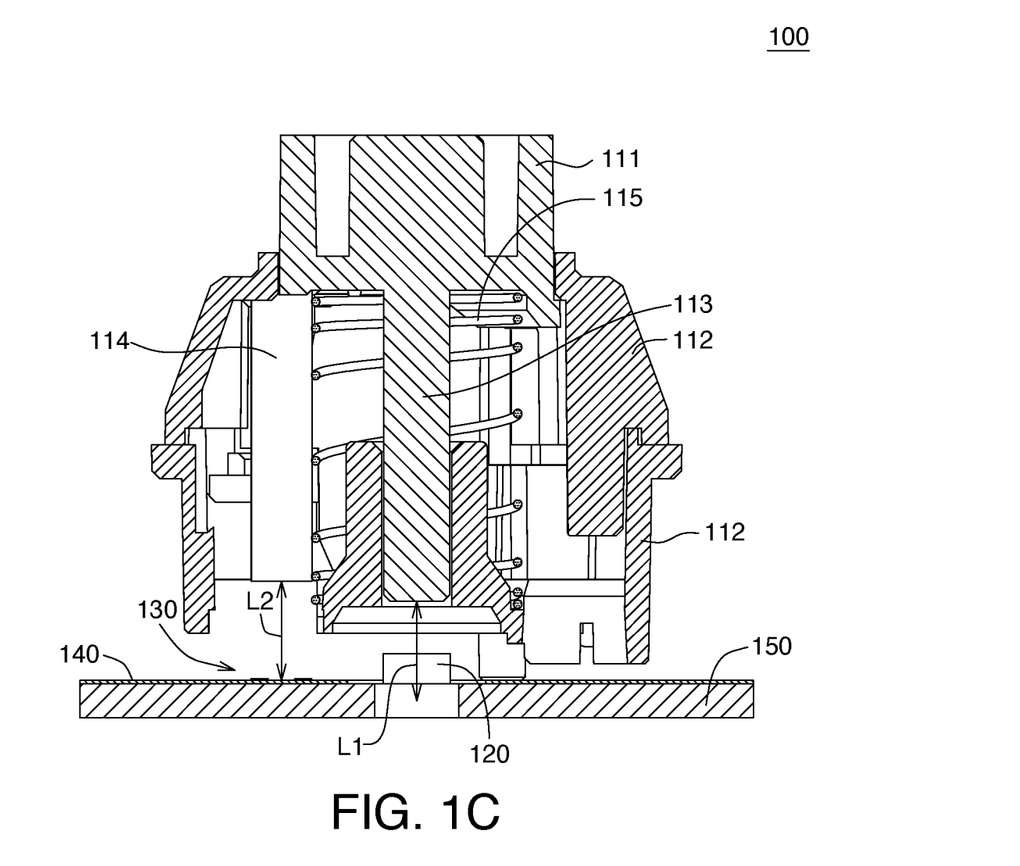
FIG. 1C is a cross-sectional view of an assembled sensing keyswitch according to an embodiment of the present disclosure.

Refer to FIGS. 1A-1C. FIG. 1A is a schematic diagram of a sensing keyboard 10 according to an embodiment of the present disclosure. FIG. 1B is an explosion diagram of a sensing keyswitch 100 according to an embodiment of the present disclosure. FIG. 1C is a cross-sectional view of an assembled sensing keyswitch 100 according to an embodiment of the present disclosure.

The sensing keyboard 10 may include several sensing keyswitches 100, such as mechanical keyswitches or scissor keyswitches. When being pressed by a user, the sensing keyswitch 100 of the present embodiment can trigger an enabling signal and a key signal. The sensing keyswitch 100 includes a key body 110, a key-sensing switch 120 and an enabling switch 130. As indicated in FIG. 1B, the key body 110, such as a mechanical key, may include a key top 111, a key seat 112, a key driver 113, an enabler 114 and a restorator 115. The key top 111 is at least partially disposed in the key seat 112 and protruded from the top opening 116 of the key seat 112. The key top 111 can directly or indirectly receive the force applied by the user and move with respect to the key seat 112 in a vertical manner. Also, one end of the key driver 113 is directly or indirectly connected to the key top 111, and the other end of the key driver 113 is downwardly extended from the key top 111 and is closely above the key-sensing switch 120. When moving downward, the key driver 113 can shield or avoid the signal path of the key-sensing switch 120 to change the luminous flux or magnetic flux or capacitance volume of the key-sensing switch 120, so that the key-sensing switch 120 can sense the change of the sensing intensity (such as light intensity, magnetic intensity, or capacitance intensity) caused by the movement of the key driver 113 to trigger a key signal S1 (referring to FIG. 2). Besides, the restorator 115 (such as a spring) is disposed in the key seat 112; one end of the restorator 115 abuts the key top 111, and the other end abuts the bottom of the key body 110 or the circuit board (the key circuit 150) underneath the key body 110. When the key driver 113 moves downwards and compresses the restorator 115, the restorator 115 can provide an elastic force to the key top 111 for restoring the key driver 113 to its initial position before being pressed.

When the key-sensing switch 120 is realized by an optical switch, the optical switch includes an emitter 121 and a receiver 122. The emitter 121 generates and projects a light to the receiver 122, and the connection line from the emitter to the receiver can be regarded as a signal (optical) path. When the key-sensing switch 120 is in the enabled mode, the movement of the key driver 113 (that is, the key driver 113 moves with the key top 111 along a key driving path L1) can trigger the key-sensing switch 120. The key driving path L1 is the movement path of the key driver 113 in a keystroke cycle (a period within which the key top moves from the highest point to the lowest point and then returns to the highest point). Generally speaking, the key driving path L1 can be located between the key driver 113 and the key-sensing switch 120, but is not limited thereto. In different embodiments, there are several paths of magnetic field lines (that is, magnetic signal paths) around the magnetic switch; the key driving path L1 does not have to be located on the connection line formed by the key driver 113 and the key-sensing switch 120, and any location would do as long as the key-sensing switch 120 can sense the change of the sensing intensity caused by the movement of the key driver 113. As for the optical switch or magnetic switch, the key driving path L1 needs to cross an optical or magnetic signal path at one part and exit the optical or magnetic signal path at the other part, so that the change of the sensing intensity sufficient to trigger the key-sensing switch 120 can be more likely generated and the triggering event can be determined. If the key-sensing switch 120 is realized by a magnetic switch, the key-sensing switch 120 may include a magnet and a Hall sensor, and the key driver 113 may include a magnetic shielding material, a magnetic conductive material or a magnet material. These materials do not have to directly shield the gap between the magnet and the Hall sensor; they only need to interfere with the magnetic signal path and change the magnetic flux received by the Hall sensor. If the key-sensing switch 120 is realized by a capacitive switch, the key-sensing switch 120 may include a pair or several of capacitive sensing electrodes, and the key driver 113 has a conductive material, and the capacitance sensed by the capacitive sensing electrodes can be regarded as a capacitive sensing signal. When the distance between the key driver 113 and the key-sensing switch 120 changes, the capacitive sensing electrodes can sense the change of capacitance and accordingly trigger a key signal S1.

Figure 2:
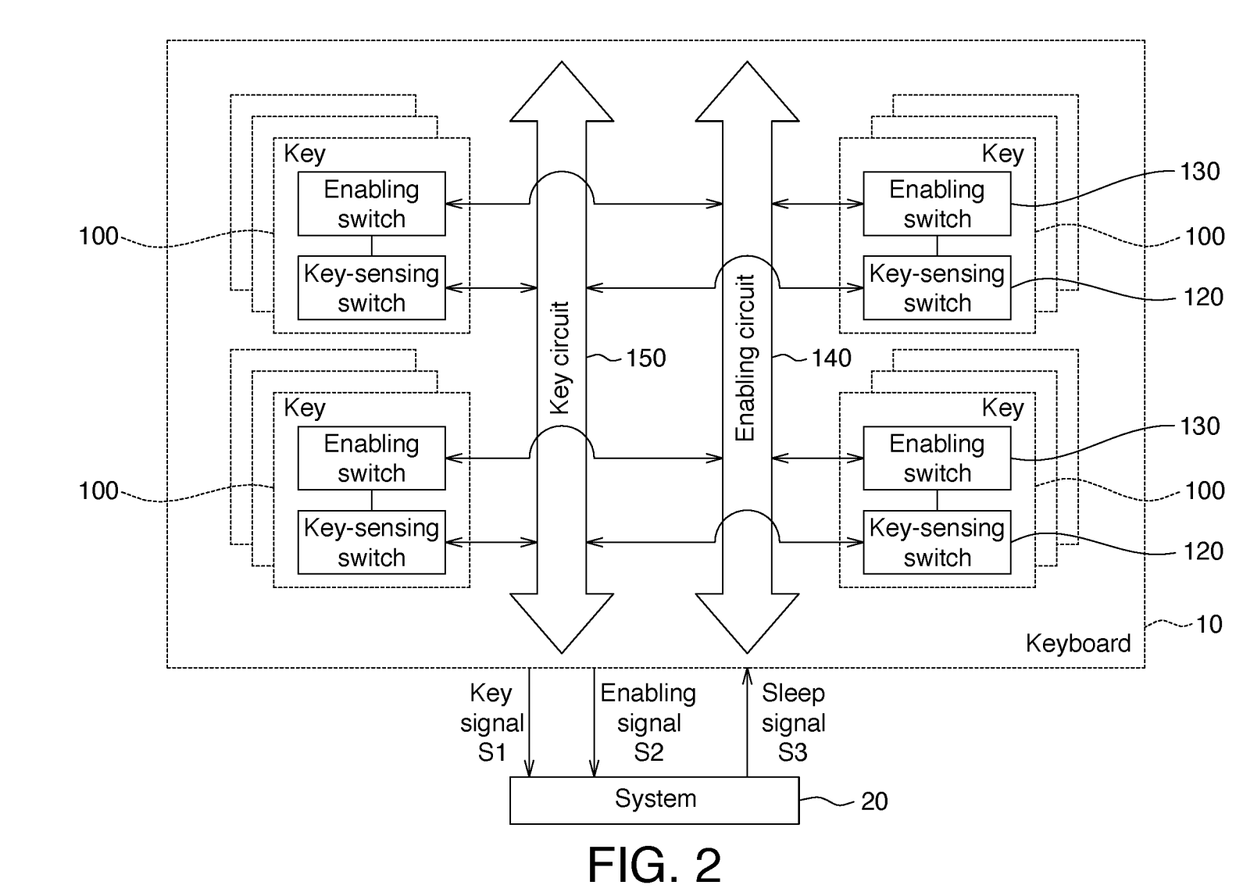
FIG. 2 is a circuit diagram of a sensing keyboard according to an embodiment of the present disclosure.

In the sensing keyswitch 100 of the present embodiment as indicated in FIG. 1C and FIG. 2, one end of the enabler 114 is directly or indirectly connected to the key top 111, and the other end of the enabler 114 is downwardly extended from the key top 111 and is closely above the enabling switch 130. When the user presses the key top 111, the enabler 114 moves downwards with the key top 111 along an enabling path L2; the enabling switch 130 when being pressed by the enabler 114 generates an enabling signal S2. The enabling signal S2 can be outputted to the keyboard controller (not illustrated) built in the sensing keyboard 10 through the enabling circuit 140 or transmitted to the keyboard controller of the system 20 (such as a computer) for enabling one or more than one sensing keyswitch 100 or the entire sensing keyboard 10 to enter an enabled mode. The enabling switch 130 can have different implementations, such as a pair of flat electrodes, a pair of upwardly extended electrodes on a printed circuit board, or a pair of conducting pads between multi-layered membranes. Based on the implementation of the enabling switch 130, the enabler 114 can have a conductive material, a magnetic conductive material, or a structure or characteristics that can trigger the enabling switch 130. If the enabling switch 130 is a tilt switch, the enabler 114 can be a set of connecting rods connecting the key top 111 and the tilt switch; or, the enabler 114 can be any element on the sensing keyboard 10 to which the tilt switch is connected as long as the said element can sense the vibration generated when the sensing keyswitch 100 is hit or pressed, and accordingly generate an triggering event.

As indicated in FIGS. 1B-1C and FIG. 2, the enabling switch 130 is electrically connected to the enabling circuit 140, which can be a single- or multi-layered circuit membrane through which the enabling signal S2 can be outputted to the system 20 for controlling the key-sensing switch 120 to enter an enabled mode. When the sensing keyswitch 100 and the key-sensing switch 120 enter the enabled mode, the key-sensing switch 120 can sense the change of the sensing intensity caused by the key driver 113 to trigger a key signal S1 (refer to FIG. 2). The key signal S1 can be outputted to the system through a key circuit 150 to obtain a corresponding operation such as the input of texts, numbers, symbols or function instructions. The key circuit 150 and the enabling circuit 140 can be disposed on the same or different circuit carriers; the key circuit 150 can provide a power enough for the key-sensing switch 120 to operate in the enabled mode and generate a sensing signal. The sensing signal can generate a key signal S1 through the shielding provided by the key driver 113 which causes the intensity of the sensing signal to change. In an embodiment, the enabling circuit 140 can control the power input of the key circuit 150. For example, the enabling circuit 140 is electrically connected between a reference voltage source and a terminal of the key circuit 150 for enabling one or more than one of the sensing keyswitches 100 of the key circuit 150 to switch between an enabled state and a disabled state by boosting or stepping down the voltage level of the said terminal. If the key circuit 150 and the enabling circuit 140 are respectively located on independent circuit boards, the key circuit 150 and the enabling circuit 140 can be stacked; if the key circuit 150 and the enabling circuit 140 are located on the same circuit board, the key circuit 150 and the enabling circuit 140 can be disposed on the same surface or opposite surfaces of the circuit board using the multi-layer circuit technology.

Since both the enabler 114 and the key driver 113 are directly or indirectly connected to the key top 111, when the user presses a sensing keyswitch 100, the enabler 114 and the key driver 113 will move with the key top 111 concurrently or sequentially. In the present example, the key driver 113 triggers the key-sensing switch 120 only after the enabler 114 has triggered the enabling switch 130. If necessary, the enabling path L2 can be shorter than the key driving path L1 of the key driver 113 to assure that in the same keystroke cycle the enabling switch 130 is triggered earlier than the key-sensing switch 120. According to such design, when a sensing keyswitch 100 is pressed for the first time in the disabled mode, the sensing keyswitch 100 and the key-sensing switch 120 are enabled and a key signal S1 is triggered. Such design also provides the sensing keyswitch 100 with an enabling/disabling function for individual key.

To put it in greater details, one of significances that the enabler 114 and the key driver 113 move with the same key top 111 upwards and downwards is that: in the disabled mode, the sensing keyswitch 100 is enabled when being pressed for the first time. The sensing keyswitch 100 is enabled when being pressed for the first time because the sensing keyboard 10 or the corresponding system 20 returns to the working mode, and this design is consistent with the user's usual setting or the conventional design of the computer system 20. The other significance is that: as long as the corresponding enabler and key driver of the same sensing keyswitch 100 can be sequentially triggered in the same keystroke cycle, the sensing keyswitch 100 will no more be related to the working mode or non-working mode of the system 20; that is, even when the system 20 and the sensing keyswitch 100 are in the working mode, some rarely used other sensing keyswitches 100 can be in the disabled mode to save power. When the system 20 and the sensing keyswitch 100 are in the working mode, the majority of the sensing keyswitches 100 still can be in the disabled mode to save power, and only the pressed sensing keyswitch 100 is enabled and then is disabled in a single keystroke cycle. Thus, a large volume of power can be saved even when the system 20 and the sensing keyswitch 100 are in the working mode. Surely, regardless whether each sensing keyswitch 100 has an exclusive enabling switch 130 or not, the keyboard controller of the sensing keyboard 10 or the system 20 can set the sensing keyswitch to maintain the enabled state for a delay period after being enabled. If the sensing keyswitch is pressed for the second time within the delay period (the second enabling signal S2 or the second key signal S1), the keyboard controller can define a working period in which all sensing keyswitches 100 can maintain the enabled state. If a sensing keyswitch is not pressed for the second time in the delay period, the sensing keyswitch 100 returns to the disabled state.

After the key signal S1 is triggered, the key-sensing switch 120 can be set to return to the disabled mode to save power. Or, after the key signal S1 is triggered, the key-sensing switch 120 maintains the enabled mode. For example, if the user needs to operate the system 20 (such as a computer) for a longer period and the sensing keyboard 10 is in the working mode, the key-sensing switch 120 can maintain the enabled mode for a longer period regardless whether the sensing keyboard 10 is used or not. When the computer or display of the system 20 enters a sleep/power saving mode or when the monitor of the notebook is closed up, the sensing keyboard 10 can receive a sleep signal S3 from the system 20 (referring to FIG. 2) for enabling all key-sensing switches 120 to enter the disabled mode. In different embodiments, after the enabling switch 130 of the sensing keyswitch 100 (the first sensing keyswitch) firstly pressed by the user is triggered by the enabler 114, it can be designed that a part or all of the sensing keyswitches 100 (several second sensing keyswitches) on the sensing keyboard 10 can enter the enabled mode, or only one sensing keyswitch 100 (the first sensing keyswitch) individually enters the enabled mode, so that a large volume of power can be saved.

In some embodiments, to control the sensing keyswitches 100 and the key-sensing switches 120 to be enabled/disabled, each sensing keyswitch 100 on the sensing keyboard 10 has an exclusive enabling switch 130. In some other embodiments, only some of the sensing keyswitches 100, such as one or a combination of 26 alphabet keys, 10 numeric keys, function keys and symbols key, have exclusive enabling switches 130. In other words, the sensing keyboard 10 can also be combined by power-saving non-sensing keyswitches and sensing keyswitches 101, so that rarely used keyswitches can be realized by power-saving non-sensing keyswitches to save power. Thus, all sensing keyswitches 100 on the sensing keyboard 10 can be enabled/disabled individually or by region.

To control the sensing keyswitches 100 and the key-sensing switches 120 to be enabled/disabled, the enabling switch 130 preferably has low or nil power-consumption. For example, the enabling switch 130 and the enabling circuit 140 can be realized by a circuit membrane or a low power-consumption key circuit, and are able to determine whether any key is pressed without incurring extra power-consumption. Refer to the table below and the circuit diagram of FIG. 2. When the sensing keyswitch 100 has both the enabling switch 130 and the key-sensing switch 120, the enabling switch 130 is not turned on before the key top 111 of the sensing keyswitch 100 is pressed and is turned on only when the key top 111 sinks and rises; the enabling circuit 140 can operate with low or nil power-consumption, and therefore can determine whether any corresponding key is pressed without incurring extra power-consumption. Besides, when the enabling switch 130 is turned on, the key-sensing switch 120 is provided with a power to enter the enabled mode and is turned on when the key body 110 is pressed, hence avoiding power-consumption arising when the key-sensing switch 120 is not used over a long period of time.

| Key top 111 | Before being pressed | Key top sinks | Key top rises | After being pressed |
|---|---|---|---|---|
| Enabling switch 130 | Enabling circuit 140 operates with low or nil power-consumption | | | |
| | Not turned on | Turned on | | Not turned on |
| Key-sensing switch 120 | Not powered Not turned on | Powered Turned on | | Not powered Not turned on |

As indicated in FIG. 2, since all enabling switches 130 are connected to the enabling circuit 140 and all key-sensing switches 120 are connected to the key circuit 150, each sensing keyswitch 100 can be individually enabled and disabled. If necessary, through the firmware setting of the keyboard controller or the design of the enabling circuit 140, it can be controlled that during the total power input of the sensing keyboard 10, when one of the sensing keyswitches 100 is enabled, the remaining sensing keyswitches 100 can also be enabled by the system 20.

Figure 3A:
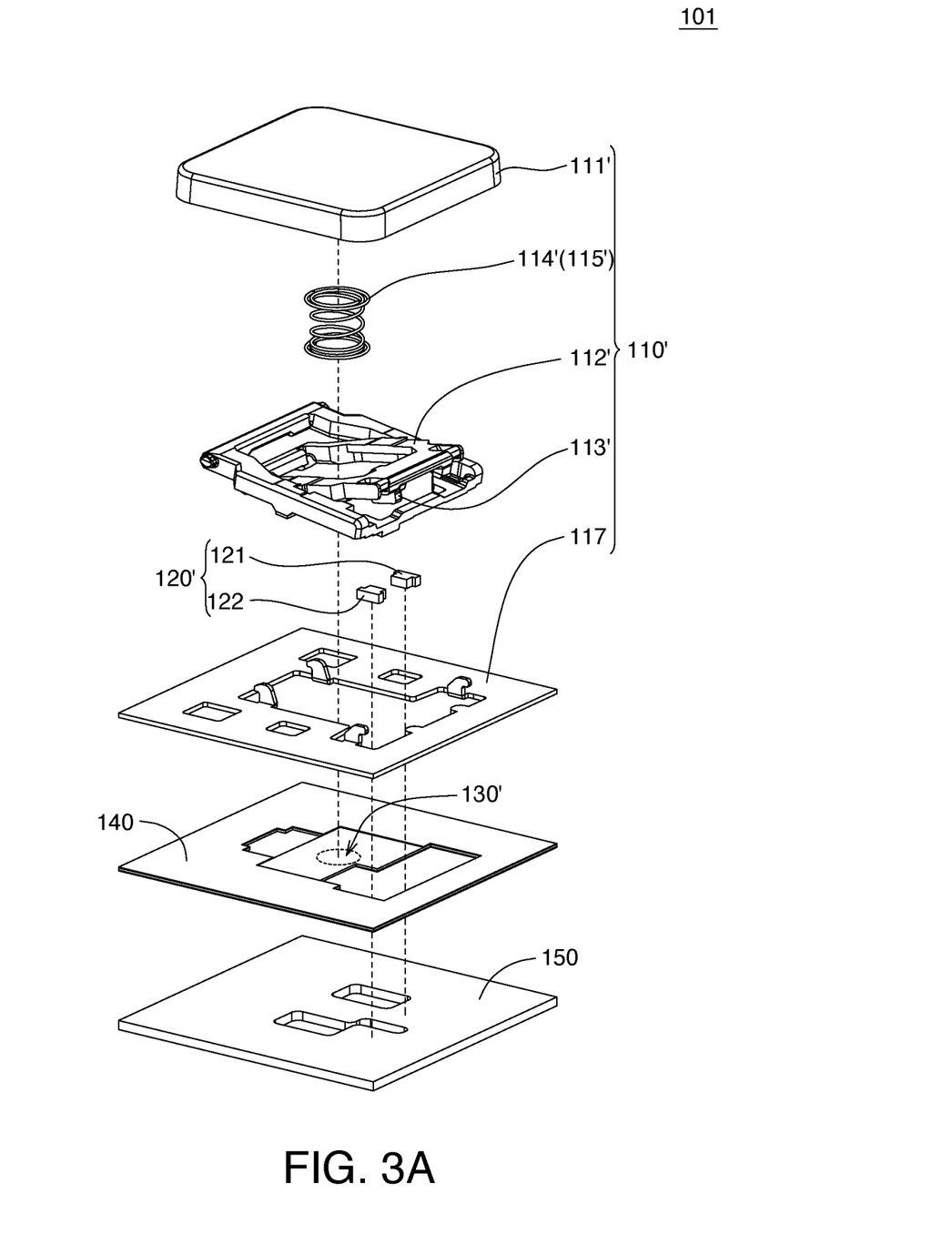
FIG. 3A is an explosion diagram of a sensing keyswitch according to an embodiment of the present disclosure.
Figure 3B:
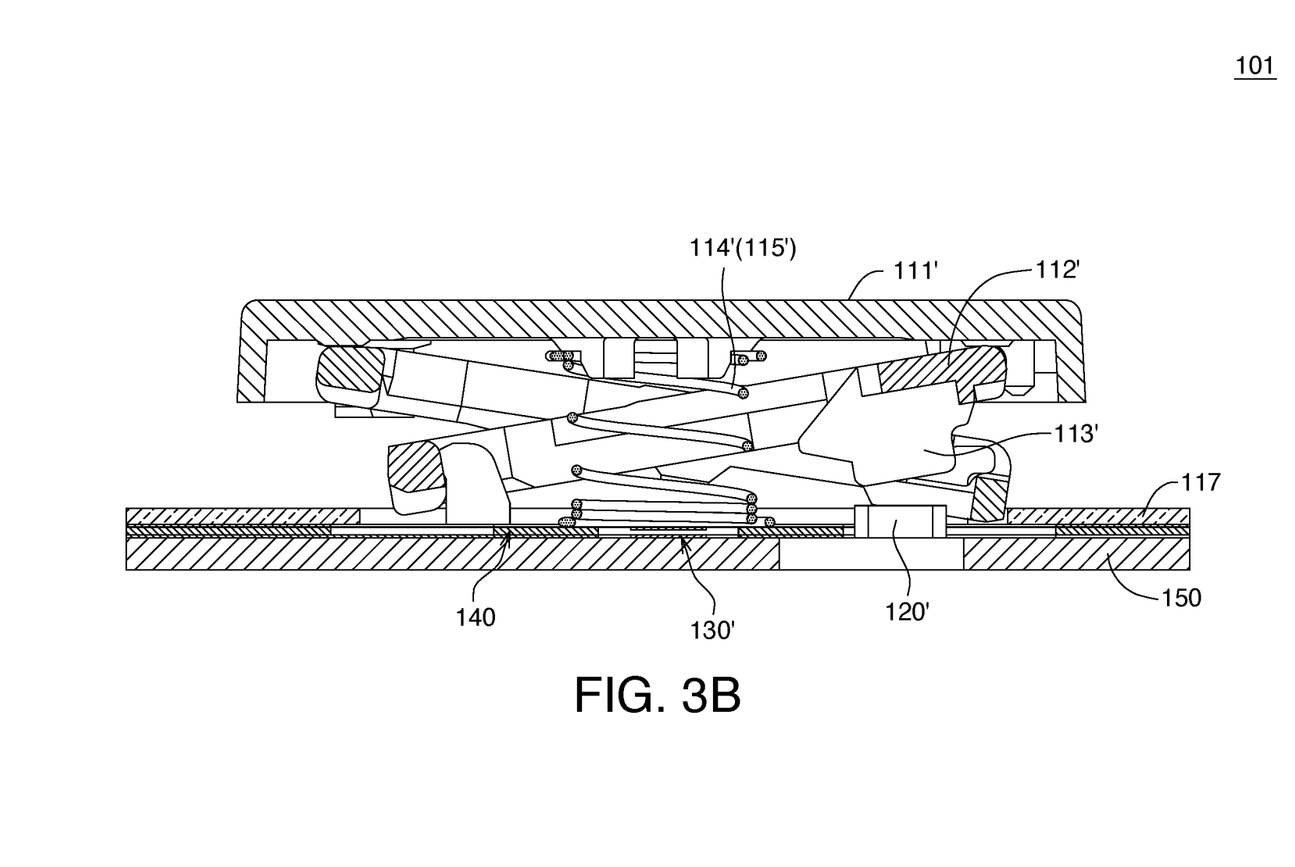
FIG. 3B is a cross-sectional view of an assembled sensing keyswitch according to an embodiment of the present disclosure.

Refer to FIGS. 3A and 3B. FIG. 3A is an explosion diagram of a sensing keyswitch 101 according to an embodiment of the present disclosure. FIG. 3B is a cross-sectional view of an assembled sensing keyswitch 101 according to an embodiment of the present disclosure.

When being pressed by the user, the sensing keyswitch 101 of the present embodiment can trigger an enabling signal and a key signal. The sensing keyswitch 101 includes a key body 110', a key-sensing switch 120' and an enabling switch 130'. The key body 110' can be realized by a scissor key, which may include a key top 111', a pair of brackets 112', a key driver 113', an enabler 114' and a bottom plate 117. In the present embodiment, the enabler 114' may be a restorator 115' (such as spring) disposed between the key top 111' and the bottom plate 117. When receiving a force, the restorator 115' can press the enabling circuit 140' (such as a circuit membrane) to generate an enabling signal. However, the enabler 114', which can also be formed by a component disposed on the key top 111' or one of the brackets 112', can trigger the enabling switch 130' using other methods, and the present disclosure does not have specific restrictions regarding the said arrangement.

When being pressed by the user, the key top 111' can move with respect to the bottom plate in a vertical manner. Also, the key driver 113' can be a part extended from the brackets 112' or the key top 111', and the other end of the key driver 113' is downwardly extended from the brackets and is closely above the key-sensing switch 120'. In another uni-illustrated embodiment, the key driver 113' can be protruded under the key top 111' and can move with the key top 111 along a key driving path (located between the key driver 113' and the key-sensing switch 120') to trigger the key-sensing switch 120'. In another unillustrated embodiment, the key driver 113' can be located on the restorator 115' and move with the restorator 115' along a key driving path to trigger the key-sensing switch 120'.

The operation principles of the sensing keyswitch 101 of the present embodiment are similar to that of the sensing keyswitch 100 of the above embodiment. That is, when the enabling switch 130' is triggered by the enabler 114' to generate an enabling signal S2 outputted through the enabling circuit 140', the enabling signal S2 can enable the key-sensing switch 120' to enter an enabled mode. Since the enabling switch 130' is turned on using low or nil power-consumption, the enabling switch 130' can determine whether the key is pressed without incurring extra power-consumption to awake the sensing keyswitch 101. Therefore, when the user does not use a key, regardless whether the sensing keyboard 10 is in the working mode or the non-working mode, the key-sensing switch 120' can be in a disabled mode to save power and achieve a power saving effect.

Figure 4A:
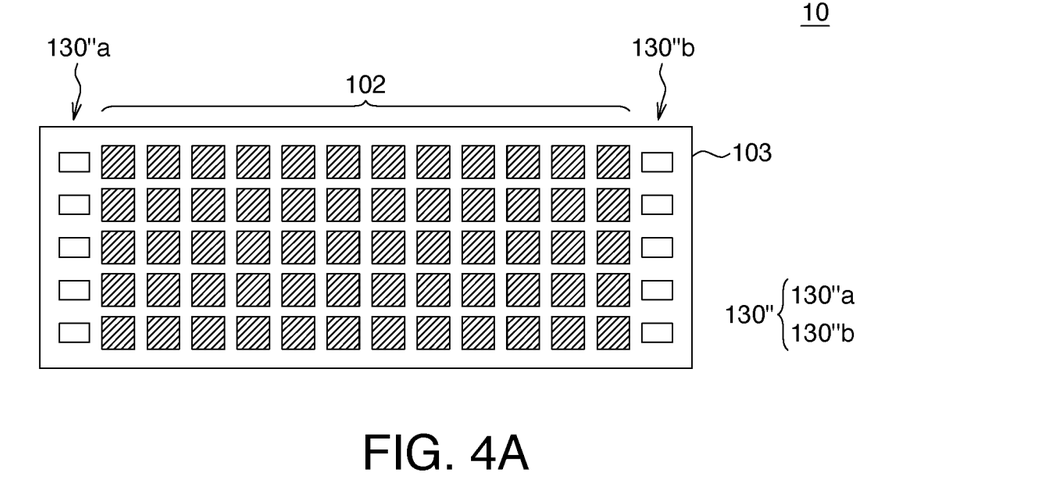
FIG. 4A is a top view of a sensing keyboard according to an embodiment of the present disclosure.
Figure 4B:
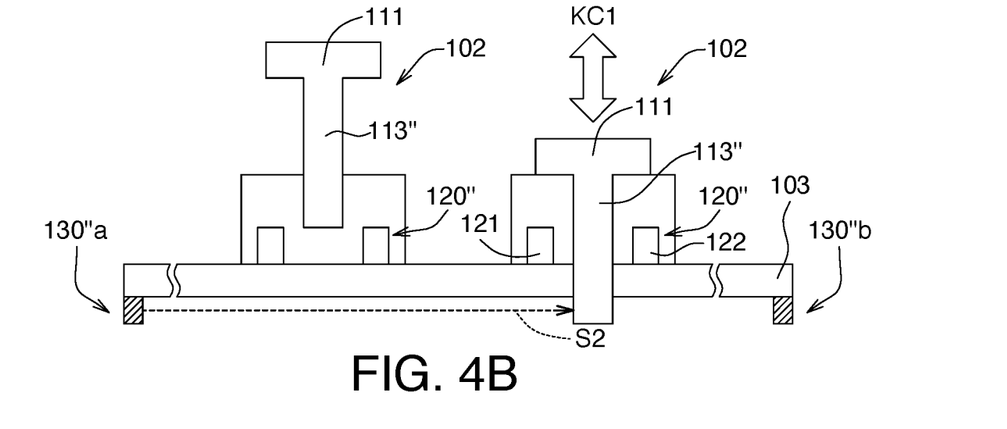
FIGS. 4B and 4C respectively are operation diagrams of a sensing keyboard according to an embodiment of the present disclosure.
Figure 4C:
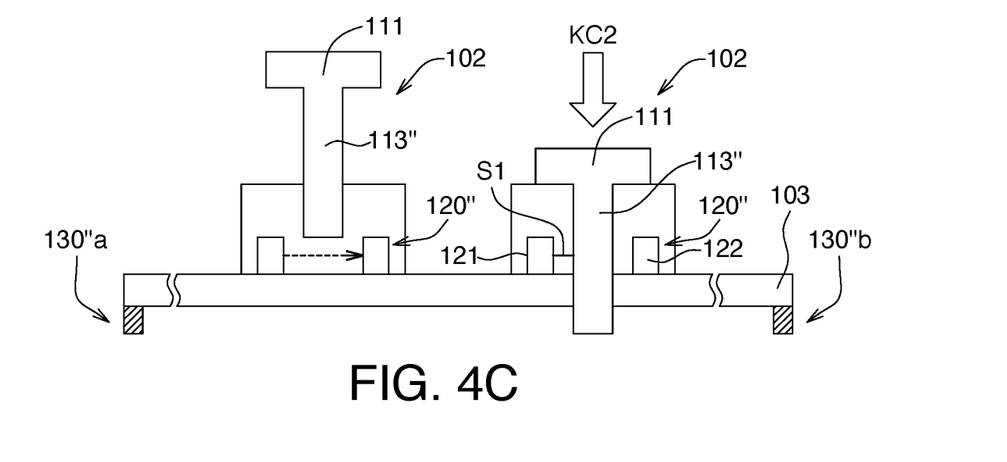

Refer to FIGS. 4A-4C. FIG. 4A is a top view of a sensing keyboard 10 according to an embodiment of the present disclosure. FIGS. 4B and 4C respectively are operation diagrams of a sensing keyboard 10 according to an embodiment of the present disclosure.

The sensing keyboard 10 of the present embodiment may include several sensing keyswitches 102, each having a key driver 113" and a key-sensing switch 120". The arrangement of the key driver 113" and the key-sensing switch 120" can be obtained with reference to the key driver 113 and the key-sensing switch 120 of FIG. 1C or the key driver 113' and the key-sensing switch 120' of FIG. 3B. The sensing keyboard 10 of the present embodiment may further include several enabling switches 130" (each includes a pair of a signal generator 130"a and a signal receiver 130"b). The enabling switches 130" can be disposed on two opposite sides of the sensing keyswitches 102 as indicated in FIGS. 4A and 4B; or, the enabling switches 130 and 130' can be individually disposed in the corresponding sensing keyswitches 100 and 101 as indicated in FIGS. 1C and 3B. The key driver 113" of the present embodiment triggers both the key-sensing switch 120" and the enabling switch 130", and can be regarded as the enabler 114 of each of the above embodiments.

In FIG. 1C or FIG. 3B, after one of the sensing keyswitches 100 (that is, the sensing keyswitch 102) is enabled by the corresponding enabler 114 (that is, the key driver 113"), only the corresponding key-sensing switch 120 of the enabled sensing keyswitch 100 can sense the change of the sensing intensity caused by the corresponding key driver 113 to trigger a key signal S1. In FIG. 4B, the corresponding key-sensing switch 120" of the remaining sensing key-switches 102 (such as the sensing keyswitches 102 located on the left-hand side) still maintains at the disabled mode.

In another embodiment similar to the key type of FIG. 1C or FIG. 3B, after one of the sensing keyswitches 100 used as the sensing keyswitch 102) is enabled by the corresponding enabler 114 (used as the key driver 113"), apart from the enabled sensing keyswitch 102, each or at least one of the remaining sensing keyswitches 102 of FIG. 4B also can sense the change of the sensing intensity caused by the corresponding key driver 113" through the corresponding key-sensing switch 120" to trigger a key signal S1.

Also, when the enabling switch 130" is disposed on two opposite sides of the sensing keyswitches 102 as indicated in FIGS. 4B and 4C, each of the sensing keyswitches 102 uses its corresponding key driver 113" as the enabler to trigger the enabling switch 130", and there is no need to additionally dispose an enabler. When the enabling switch 130" is triggered, the key-sensing switch 120" of each sensing keyswitch 102 enters an enabled mode, so that the corresponding key-sensing switch 120" can sense the change of the sensing intensity caused by the corresponding key driver 113" to trigger a key signal S1.

The present embodiment is different from the above embodiments in that: in FIG. 4B, after the enabling switch 130" is triggered in the previous keystroke cycle KC1, in FIG. 4C, the key-sensing switch 120" can only be triggered after the next keystroke cycle KC2. That is, the enabling switch 130 and the key-sensing switch 120" cannot be triggered in the same keystroke cycle KC1. After being enabled, the key-sensing switch 120" maintains at the enabled mode, and the enabling switch 130" is in a disabled mode; when the key-sensing switch 120" returns to the disabled mode, the enabling switch 130" can be in an enabled mode.

The enabling switch 130" and the key-sensing switch 120" of the present embodiment can be two sets of independent optical or magnetic switches. Each set of optical switches includes an emitter 121 and a receiver 122. The emitter 121 generates and projects a light to the receiver 122. The enabling switch 130" can be disposed on a first surface (such as the bottom surface) of the circuit board 103, the key-sensing switch 120" can be disposed on a second surface (such as the top surface) of the circuit board 103; or, the enabling switch 130" and the key-sensing switch 120" are disposed on the same surface (such as the top surface) of the circuit board 103 as long as the enabling switch 130" and the key-sensing switch 120" are staggered and do not interfere with each other.

In another embodiment, the quantity of the enabling switch 130" can be one, and the arrangement of the enabling switches 130" is not limited to the arrangement of FIG. 3A in which several enabling switches are arranged on two opposite sides of the sensing keyboard 10. The enabling switch 130" can be disposed on any position of the sensing keyboard 10. When the key top 111 of at least one of the sensing keyswitches 102 moves, the key top 111 drives the enabler 114 (the key driver 113") to move synchronically, so that the enabler 114 (the key driver 113") can trigger the enabling switch 130".

Besides, when the key-sensing switches 120" maintain at the enabled mode, the enabling switch 130" is in a disabled mode; when the key-sensing switches 120" return to the disabled mode, the enabling switch 130" is in an enabled mode. Thus, either of the above arrangements would do as long as one of the key-sensing switch 120" and the enabling switch 130" maintains at the enabled mode. Since the quantity of the enabling switches 130" is less than the quantity of the key-sensing switches 120", the sensing keyboard 10 of the present embodiment can determine whether any key is pressed and awakens at least one of the sensing keyswitches 102 with less power-consumption.

Figure 5:
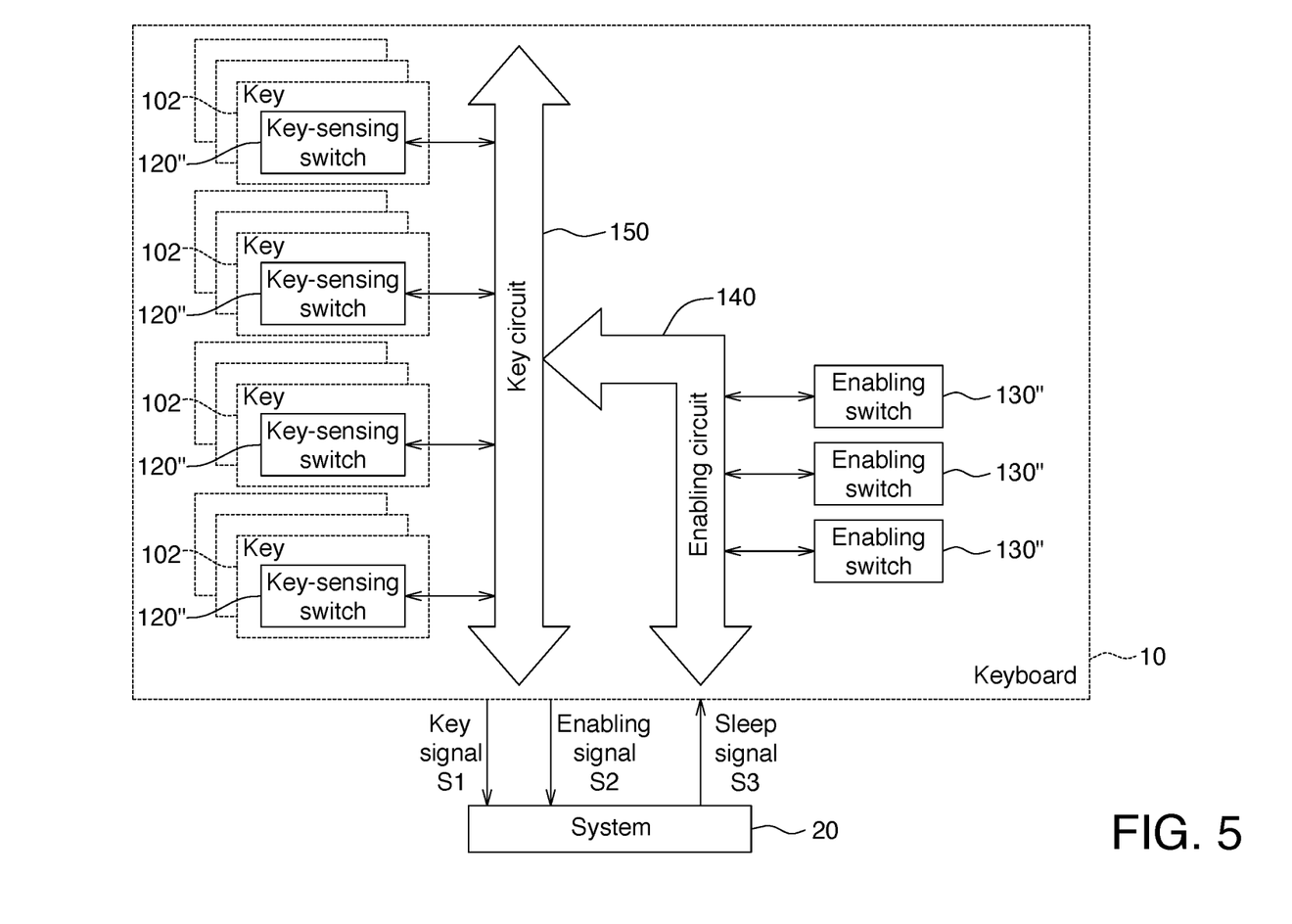
FIG. 5 is a circuit diagram of a sensing keyboard according to an embodiment of the present disclosure.

FIG. 5 is a circuit diagram of a sensing keyboard 10 according to an embodiment of the present disclosure. As indicated in FIG. 5, since all enabling switches 130" are connected to the enabling circuit 140, all key-sensing switches 120" are connected to the key circuit 150, and the key-sensing switches 120" can share the enabling switch 130" through the enabling circuit 140. Thus, when one of the sensing keyswitches 102 is enabled, the remaining sensing keyswitches 102 can also be enabled by the system 20.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A sensing keyswitch, comprising:
   a key body, comprising a key top, a key driver and an enabler, wherein the key driver and the enabler can move with the key top in a same keystroke cycle;
   a key-sensing switch electrically connected to a key circuit, wherein the key-sensing switch is in a disabled mode to save power and cannot sense a change of sensing intensity caused by a movement of the key driver; and
   an enabling switch electrically connected to an enabling circuit;
   wherein, when the enabling switch is triggered by the enabler, the enabling switch outputs an enabling signal through the enabling circuit for enabling the key-sensing switch to enter an enabled mode, so that the key-sensing switch can sense the change of the sensing intensity caused by the movement of the key driver to trigger a key signal.

2. The sensing keyswitch according to claim 1, wherein after the key signal is triggered, the key-sensing switch returns to the disabled mode to save power.

3. The sensing keyswitch according to claim 1, wherein after the key signal is triggered, the key-sensing switch maintains at the enabled mode.

4. The sensing keyswitch according to claim 1, wherein when the key-sensing switch maintains at the enabled mode, the enabling switch is in a disabled mode; when the key-sensing switch returns to the disabled mode, the enabling switch is in an enabled mode.

5. The sensing keyswitch according to claim 1, wherein the enabler moves with the key top along an enabling path to trigger the enabling switch.

6. The sensing keyswitch according to claim 1, wherein the key driver moves with the key top along a key driving path to trigger the key-sensing switch.

7. The sensing keyswitch according to claim 1, wherein the key body comprises a pair of brackets, a bottom plate and a restorator; the pair of brackets connect the key top and the bottom plate, the restorator is disposed between the key top and the bottom plate, and the key driver is located on the key top, the brackets or the restorator.

8. The sensing keyswitch according to claim 1, wherein the key driver and the enabler are extended from the key top in one piece and synchronically move with the key top.

9. The sensing keyswitch according to claim 1, wherein in the keystroke cycle, the enabling switch is triggered earlier than the key-sensing switch.

10. The sensing keyboard comprising a plurality of sensing keyswitches according to claim 1, wherein after one of the sensing keyswitches is enabled by a corresponding enabler, only a corresponding key-sensing switch of the enabled sensing keyswitch can sense the change of the sensing intensity caused by the movement of the corresponding key driver to trigger the key signal, a corresponding key-sensing switches of the remaining sensing keyswitches maintain at the disabled mode.

11. The sensing keyboard comprising a plurality of sensing keyswitches according to claim 1, wherein the sensing keyswitches respectively have an exclusive enabler and an exclusive enabling switch; after one of the sensing keyswitches is enabled by a corresponding enabler, apart from the enabled sensing keyswitch, each or at least one of the remaining sensing keyswitches also can sense the change of the sensing intensity caused by the movement of the corresponding key driver to trigger the key signal through the corresponding key-sensing switch.

12. A sensing keyboard, comprising:
    at least one enabling switch and an enabler, wherein the enabling switch is electrically connected to an enabling circuit; and
    a plurality of sensing keyswitches, each comprising:
        a key body, comprising a key top and a key driver, wherein when the key top moves, the key driver is synchronically driven to move; and
        a key-sensing switch electrically connected to a key circuit, wherein the key-sensing switch is in a disabled mode and cannot sense a change of sensing intensity caused by a movement of the key driver;
    wherein, when the key top of at least one of the sensing keyswitches moves and the enabler is synchronically driven to move and trigger the enabling switch, the key-sensing switch enters an enabled mode, so that the key-sensing switch can sense the change of the sensing intensity caused by the movement of the key driver to trigger a key signal.

13. The sensing keyboard according to claim 12, wherein after the enabling switch is triggered in a previous keystroke cycle, the key-sensing switch cannot be triggered until a next keystroke cycle.

14. The sensing keyboard according to claim 12, wherein after the key signal is triggered, the key-sensing switch returns to the disabled mode to save power.

15. The sensing keyboard according to claim 12, wherein after the key signal is triggered, the key-sensing switch maintains at the enabled mode.

16. The sensing keyboard according to claim 12, wherein when the key-sensing switch maintains at the enabled mode, the at least one enabling switch is in a disabled mode; when the key-sensing switch returns to the disabled mode, the at least one enabling switch is in an enabled mode.

17. The sensing keyboard according to claim 12, wherein the key driver moves with the key top along a key driving path to trigger the key-sensing switch, the enabler moves with the key top along an enabling path to trigger the enabling switch, and the enabling path is shorter than the key driving path.

18. The sensing keyboard according to claim 12, wherein the sensing keyboard has a working mode and a non-working mode; at least one of the sensing keyswitches in the working mode normally is in the disabled mode to save power.

19. The sensing keyboard according to claim 12, wherein after entering the enabled mode, one of the sensing keyswitches maintains the enabled state in a delay period; if one of the sensing keyswitch is not pressed for second time in the delay period, the sensing keyswitches return to the disabled state.

20. A sensing keyboard, comprising:
at least one enabling switch electrically connected to an enabling circuit; and
a plurality of sensing keyswitches, each comprising:
  a key body, comprising a key top and a key driver, wherein when the key top moves, the key driver is synchronically driven to move; and
  a key-sensing switch electrically connected to a key circuit, wherein the key-sensing switch is in a disabled mode and cannot sense a change of sensing intensity caused by a movement of the key driver;
wherein, in a first keystroke cycle, the key top of at least one of the sensing keyswitches is pressed for a first time and drives the key driver to move and trigger the enabling switch, so that the key-sensing switch enters an enabled mode;
wherein, within at least one second keystroke cycle after the first keystroke cycle, the key top of at least one of the sensing keyswitches is pressed and drives the key driver to move, so that the key-sensing switch can sense the change of the sensing intensity caused by the movement of the driver to trigger a key signal.

\* \* \* \* \*